May 3, 1927. 1,626,702
L. D. SOUBIER
APPARATUS FOR FORMING GLASS
Filed Oct. 11, 1920 6 Sheets-Sheet 1

Fig. 1

INVENTOR
L. D. Soubier,
By J. F. Rule,
Attorney.

May 3, 1927.

L. D. SOUBIER 1,626,702

APPARATUS FOR FORMING GLASS

Filed Oct. 11. 1920

INVENTOR
L. D. Soubier,
By J. F. Rule,
Attorney.

May 3, 1927.

L. D. SOUBIER 1,626,702

APPARATUS FOR FORMING GLASS

Filed Oct. 11, 1920

L. D. SOUBIER

1,626,702

APPARATUS FOR FORMING GLASS

Filed Oct. 11. 1920       6 Sheets-Sheet 5

INVENTOR

Patented May 3, 1927.

1,626,702

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

APPARATUS FOR FORMING GLASS.

Application filed October 11, 1920. Serial No. 416,022.

My invention relates to machines for forming bottles or other glass articles. An object of the invention is to provide a machine of this character having a much greater capacity than those at present in general use. In its preferred form the machine comprises a combination and arrangement of molds and other parts in such manner that a plurality of series of bottles or other articles are being simultaneously formed on the machine. Charges of glass are simultaneously introduced into a plurality of molds and the several steps in the formation of the articles from said charges are carried on concurrently.

Other features of advantage will appear hereinafter.

The invention in its preferred form comprises various structural features disclosed in the United States patent to Joseph B. Graham, Number 1,405,204, January 31, 1922.

Figure 1:
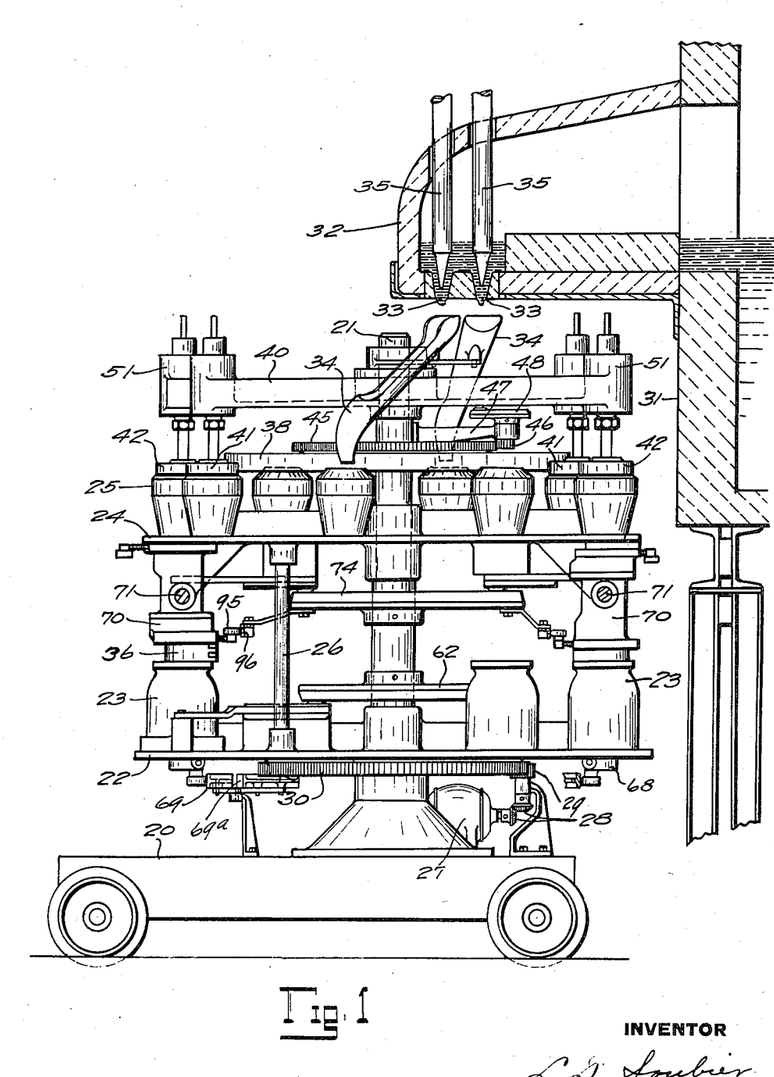
Figure 1 is a side elevation of a continuously rotating machine and glass feeder, embodying the principles of my invention.
Figures 2, 3, 4:
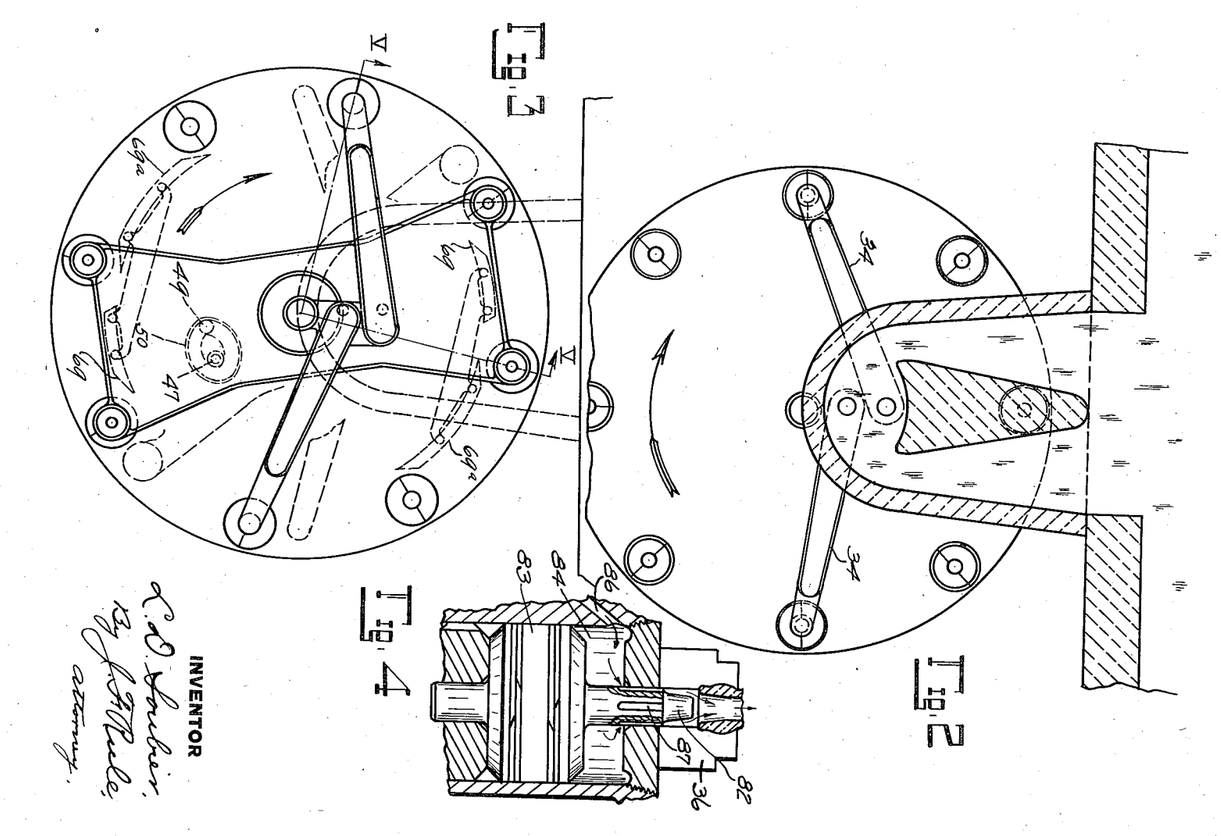
Figure 2 is a diagrammatic plan of a machine adapted for intermittent rotation.
Figure 3 is a diagrammatic plan of the machine shown in Figure 1.
Figure 4 is a sectional view of a plunger for forming the initial blow opening in the blank, and the piston motor for actuating the plunger.
Figure 5:
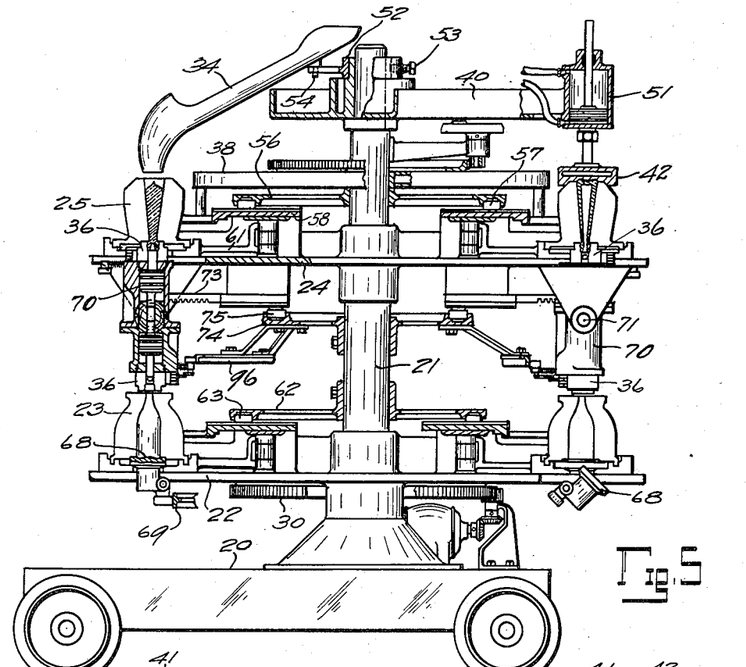
Figure 5 is a part sectional elevation of the machine shown in Figure 1.

Referring particularly to Figures 1, 3 and 5, the glass blowing machine is mounted on a wheel base or truck 20 for movement toward and from the furnace. The mold carriage is mounted for rotation about a stationary vertical column 21 supported on said base. The mold carriage comprises a lower spider or table 22 on which the finishing molds 23 are mounted, and an upper mold table or spider 24 on which the blank receiving or parison molds 25 are supported, the mold tables being rigidly connected by vertical posts 26. The mold carriage is rotated continuously by a motor 27 having a driving connection with the carriage through gears 28, pinion 29 and gear 30, the latter being secured to the carriage.

Two charges of glass are supplied to the machine at a time, these charges being preferably simultaneously dropped into diametrically opposite blank molds. The glass is supplied from a furnace 31 having a boot or extension 32 with outlet openings 33 in the bottom thereof. The glass issuing from said openings is formed into individual masses or gobs which are severed and dropped into inclined chutes 34, down which the gobs slide by gravity to the molds. Any suitable or approved form of gob forming mechanism may be employed. For example, a pair of vertically reciprocating plungers 35 control the flow of glass and assist in forming the gobs. The specific means for actuating said plungers and for severing the gobs do not in themselves form a part of the present invention and are not herein shown. In my co-pending application, Serial Number 424,198, filed November 15, 1920, I have disclosed and claimed a gob forming mechanism which may be used with the present invention.

An air distributing head or drum 38 is connected with the carriage to rotate therewith and supplies air for the several blowing operations hereinafter described. A frame 40 mounted above the carriage to oscillate about the center column 21 carries at each end thereof, a blowing head 41 adapted to engage the blank molds successively, and a head 42 also adapted to engage the blank molds and form a closure therefor, as hereinafter explained. The frame 40 is oscillated by means of a gear 45 (Fig. 1) connected to the drum 38, said gear meshing with a pinion 46 on a vertical shaft 47 (Fig. 3). An arm 48 on the shaft 47 carries a cam roll 49 running in a cam groove 50 in the frame 40. The parts are so proportioned that as the carriage rotates, the frame 40 will advance at the same angular velocity through a certain distance while the heads 41 and 42 are directly over certain of the blank molds. The frame 40 then returns so that each of the heads 41 and 42 will be brought into vertical alignment with the next succeeding mold and again advance with the molds. Each of the heads 41 and 42 is moved up and down by an air motor 51 (Figs. 1 and 5).

As shown in Figure 5, the chutes 34 are mounted on the frame 40 to oscillate therewith. This mounting comprises a bracket 52 rotatively and vertically adjustable on the hub of the frame 40 and secured thereto by a set screw 53. Each chute 34 has a pivotal connection 54, permitting independent horizontal adjustment of each chute, either radially or in an arc about said pivot 54.

Figure 6:
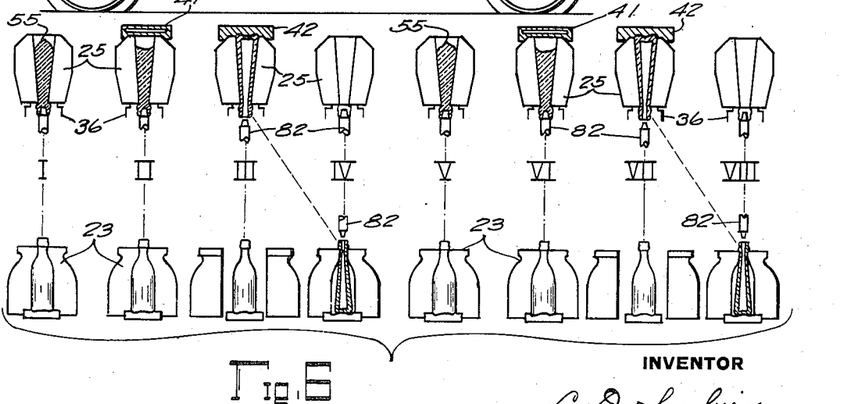
Figure 6 is a schematic view of the molds and blanks, showing the successive steps in the formation, transfer and discharge of the blanks.
Figure 7:
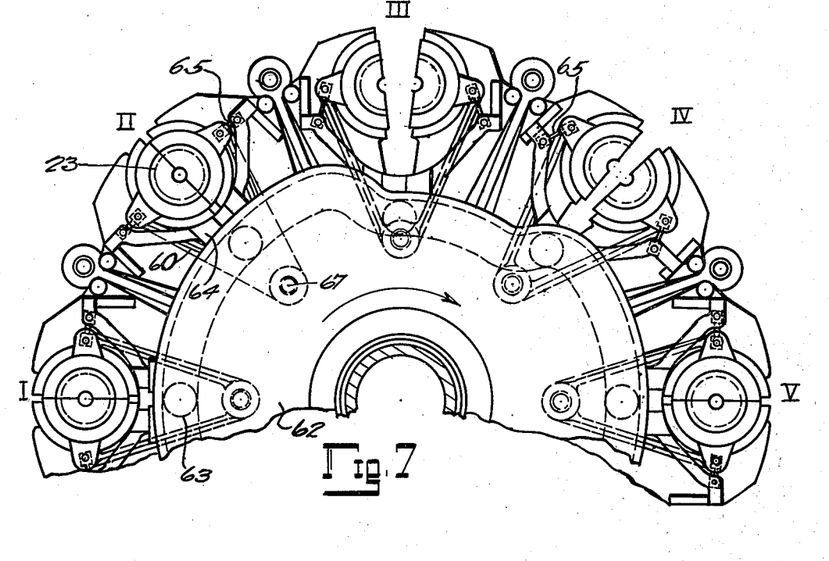
Figure 7 is a plan view, partly broken away, showing the finishing molds and their operating cam.

The machine as shown comprises eight sets or groups of molds, although this number may be varied, each group comprising a blank mold 25, two neck molds 36 and a finishing mold 23 arranged in vertical alignment. Figure 6 diagrammatically illustrates the eight groups of molds, and may also be taken to indicate a mold group and the condition of the glass therein at eight successive portions or periods in the formation of the bottles. Groups I and V show a charge or parison 55 just after it has entered the blank mold. Groups II and VI illustrate the next step, the carriage having been advanced one-eighth of a revolution and the blowing heads 41 being in engagement with the molds. While in this position, air under pressure is supplied through said heads and compacts the glass in the molds. Simultaneously with the movement of the blowing heads 41 into engagement with their molds, the heads 42 are moved downward to engage the molds of groups III and VII, thereby forming a closure for the inverted blank molds while air is introduced through the neck mold to blow the blank into a hollow parison. During the movement of the molds from the positions III and VII to positions IV and VIII respectively, the blank molds open, the parisons swing downward and enter the finishing molds, and the latter close, permitting the bottles to be blown to finished form. This final blowing takes place and the finishing molds open and discharge their bottles in time to receive the next succeeding parisons.

Figure 8:
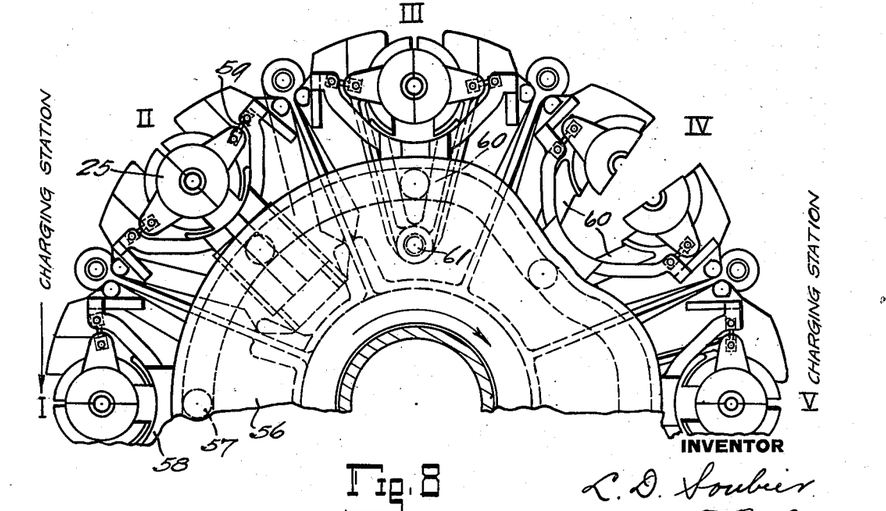
Figure 8 is a similar view of the blank molds and their operating cam.

Referring to Figures 5 and 8, the opening and closing movements of the blank molds 25 are effected by a stationary cam 56 having a cam groove in which run cam rolls 57 connected to radially slidable yokes 58. Each yoke is connected through links 59 to the two sections of the blank mold. These sections are carried on arms 60 which swing about the pivot pin 61 on the mold table 24. When the yoke 58 is moved inward toward the axis of the machine, it operates through the links 59 to separate the mold sections, thereby releasing the parison and permitting it to be swung downward into a finishing mold. The finishing molds are opened and closed by means similar to that just described in connection with the blank molds. Such means comprises a stationary cam 62 for actuating the cam rolls 63 connected to yokes 64, which yokes are connected through links 65 to the sections of the blow mold 23, said sections being carried by arms 66 on the stationary pivot pin 67.

Mold bottoms 68 (see Figs. 1 and 5) for the finishing molds may be pivotally connected to the mold table 22. These mold bottoms are locked in position by the finishing molds while the latter remain closed. Just before a finishing mold opens to discharge its bottle, its bottom plate 68 contacts with a stationary cam 69, which supports said bottom plate and the bottle thereon during the opening of the mold, and then allows the bottom plate to be tilted by gravity to the position shown at the right in Figure 5 to discharge the bottle. The bottom plate is then automatically returned to horizontal position by the stationary cam 69$^a$.

When a blank mold is opened, the bare blank is left supported in the neck mold 36, from which it projects upwardly. The blank is then transferred to the finishing mold 23 directly beneath by means of the transfer head 70 on which the neck mold is mounted. This head is provided with bearing sleeves 80 by which it is journalled to rotate on horizontal shafts 71, said shafts being supported in bearings 72 on the mold carriage, whereby the neck mold is inverted and the blank swung downward into the finishing mold. The rotation of the transfer head is effected by a rack 73 reciprocated radially by means of a stationary cam 74 on which runs a cam roll 75 connected to the rack. The rack runs in mesh with a pinion 76 having a one way driving connection with the head 70. This driving connection comprises dogs 77 (Fig. 12) connected by pivots 78 to the pinion, the dogs engaging shoulders 79 formed on one of the bearing sleeves 80. Springs 81 hold the dogs against said sleeve. As the rack moves radially outward, the transfer head is rotated through 180 degrees, carrying the parison from the Figure 9 position to the Figure 10 position. When the rack 73 is returned, the dogs 77 slide idly over the bearing sleeve 80 so that their positions with respect to said sleeve are reversed. It will thus be noted that the transfer head is always rotated in the same direction.

Figures 9, 10, 11, 12, 13:
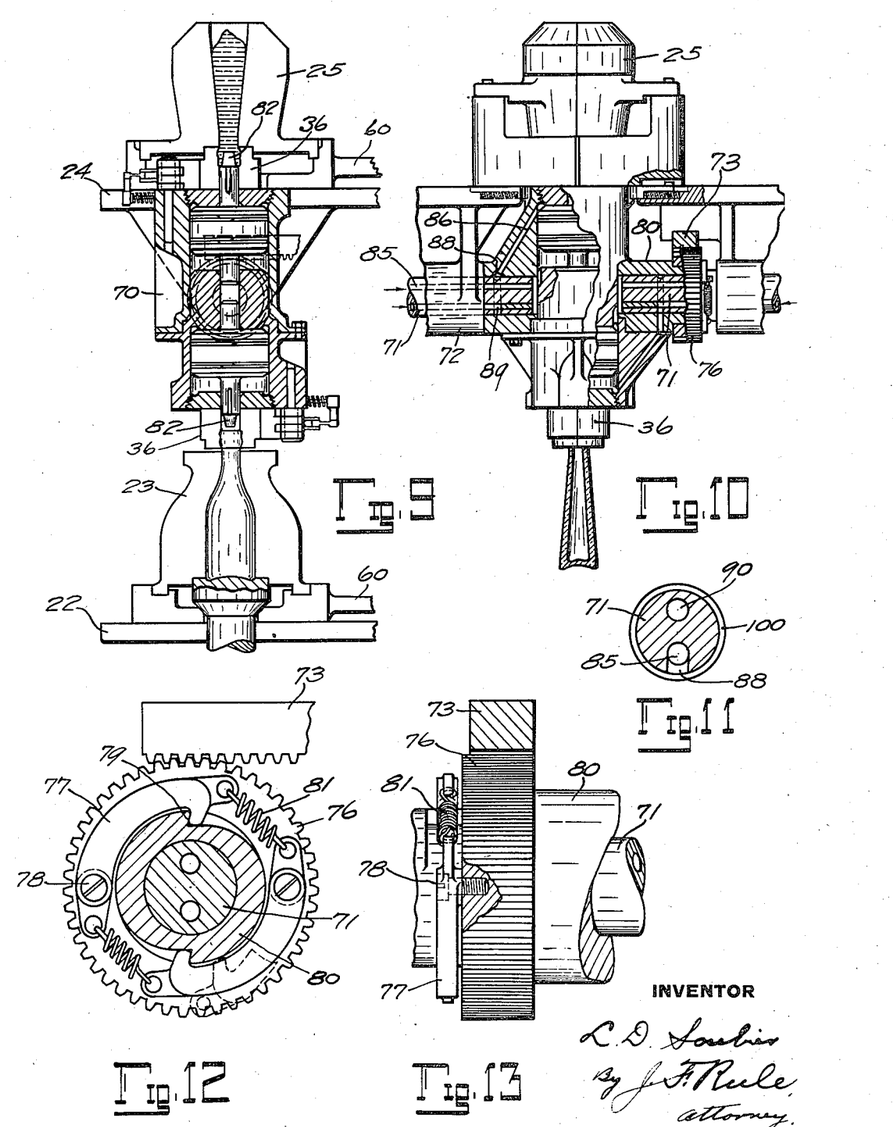
Figure 9 is a sectional side elevation showing one of the units comprising a blank mold, a finishing mold and a transfer head.
Figure 10 is a part sectional front elevation of the same, but with the finishing mold omitted.
Figure 11 is a sectional view of the axle on which the transfer head rotates.
Figure 12 is a sectional view of the means for rotating said head.
Figure 13 is a view of the same looking in a direction at right angles to that of Figure 12.
Figures 14, 15:
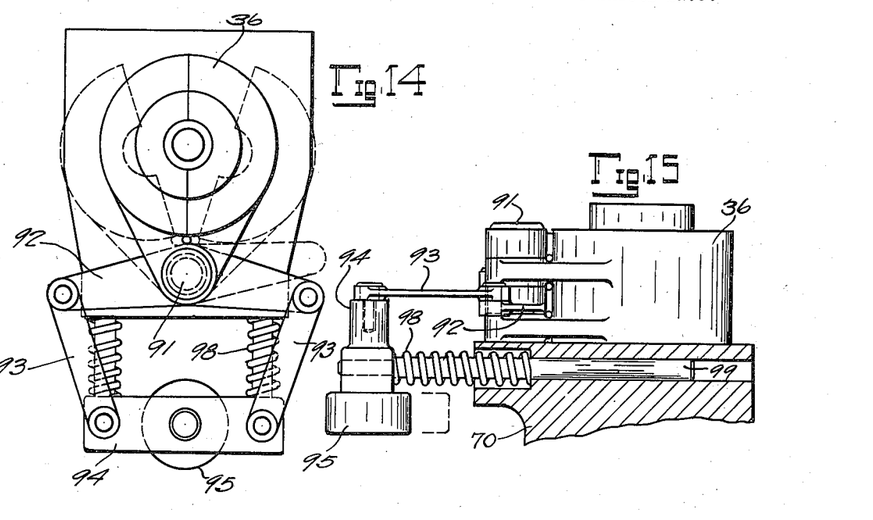
Figure 14 is a plan view showing a neck mold.
Figure 15 is an elevation of the same.
Figure 16:
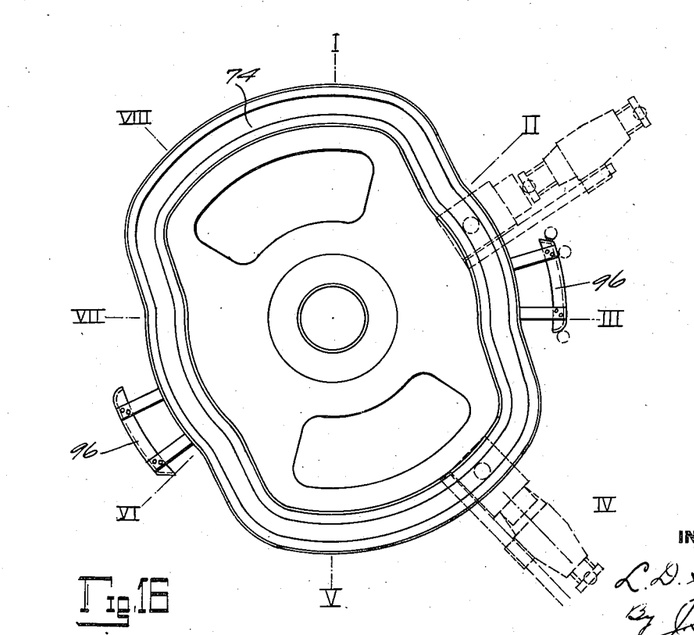
Figure 16 is a plan view illustrating particularly the operating cams for actuating the transfer heads and for opening the neck molds.

The head 70 carries at each end a plunger 82 for forming an initial blow opening in the blank. Each plunger is actuated by a piston motor comprising a piston 83 (see Fig. 4) operating in a cylinder 84. The plunger 82 is in its upward position at the time the glass is dropped in the blank mold and when air pressure is applied to the blank from the blowing head 41, as heretofore described, the glass is pressed down compactly in the mold and completely surrounds the plunger 82, thereby forming the neck of the bottle. When the mold advances to position III and the head 42 is seated on the mold, air under pressure is admitted momentarily through a passageway 85 in the shaft 71 and a passageway 86 leading to the upper end of the cylinder 84. This moves the piston 83 downward and admits a puff of air through the grooves 87 (Fig. 4) in the plunger 82, to the blow opening from which the plunger has been withdrawn. The air beneath the piston 83 is exhausted through a passageway 90 in the shaft 71. Later a larger volume of air is admitted through said passageway and the parison thereby blown to hollow form, after which the blank mold is opened and the transfer head rotated in the manner heretofore described, thus swinging the parison into the open blow mold beneath, which then closes. The compressed air then blows the parison to its final form in the finishing mold. By reference to Figures 10 and 11, it will be seen that the passageway 85 is at all times in communication with the passageway 86 through a port 88 and an annular channel 100 in the periphery of the shaft 71. When the head 70 is again rotated to swing the neck mold up, the air connections to the passageways 85 and 90 are reversed so that air pressure is admitted through the passageway 85 and enters the cylinder 84 beneath the piston 83, thereby moving the core 82 up for a succeeding operation. Suitable automatic valve mechanism, such as shown, for example, in the Graham patent hereinbefore referred to, may be employed to control the air supply to the molds and plunger motors. As shown in Figure 10, the shaft 71 on the right hand side of the transfer head is provided with air passages for supplying air to the lower neck mold and plunger piston in said figure. The arrangement and operation are the same as that just described, but the air supply to the two neck molds and plungers is independently controlled. Each of the neck molds, as shown in Figures 14 and 15, comprises sections mounted on a pivot pin 91, each section having an arm 92, said arms connected through links 93 to a yoke 94 carrying a roll 95 which is adapted to run on cams 96 (Fig. 16) which may be conveniently attached to the cam frame 74. The neck mold is normally held closed by springs 98 interposed between the yoke 94 and the transfer head 70 on which the neck mold is supported. Rods 99 attached to the yoke 94 provide a sliding connection between the yoke and the head 70. The cams 96, as shown in Figure 16, are so positioned that they open the neck mold as the latter approaches positions III and VII. The neck molds are thus opened while in register with the finishing molds and simultaneously with or shortly before the opening of the finishing molds to discharge the bottles.

Figure 2 indicates diagrammatically a construction in which the rotation of the mold carriage may be intermittent, each step in the rotation corresponding to the angular distance between each two adjacent molds. With this construction the chutes 34 may be stationary as the molds are brought to rest beneath said chutes to receive their charge.

Many of the structural features embodied in the construction herein illustrated, as for example, the molds, the mechanism for opening and closing the molds, valve mechanism for controlling the supply of air to the molds, etc., may be substantially like corresponding parts disclosed in the patent to Graham hereinbefore referred to.

Modifications may be resorted to within the spirit and scope of my invention.

What I claim is:

1. In a glass forming machine, in combination, molds, and means co-operating therewith for forming charges of glass in the molds by a series of operations, there being a plurality of said means operative to effect the same operations on a number of charges in separate molds simultaneously, each of said means being arranged to co-operate with each of the separate molds in succession.

2. In a glass forming machine, the combination of separate molds arranged to receive charges of glass simultaneously, and separate means provided in duplicate co-operating with said molds for concomitantly forming the charges of glass into finished articles by a series of operations, whereby the formation of the articles is effected simultaneously, each of said forming means being brought into cooperative relation to each of the separate molds in succession.

3. In a glass forming machine, the combination of molds traveling in the same closed path, automatic means to supply charges of molten glass to each mold while at different points in said path, and means co-operating with the molds for blowing the charges of glass to hollow form in the molds concurrently, the blowing of one charge taking place while its mold is traveling through a different portion of its path than that through which another of the molds is traveling during the blowing of the glass therein.

4. In a machine for forming hollow glass articles, the combination of a mold carriage rotatable about a vertical axis, a mold carried thereby, means to supply individual charges of molten glass to the mold while at different points in its path of travel, and means co-operating with the mold for successively forming said charges while the carriage is making a single complete rotation, said forming means including means to blow the charges of glass to their finished hollow form.

5. In a glass forming machine, the combination with a mold carriage, a multiplicity of parison molds thereon, means to rotate said carriage and bring each mold to a plurality of charging positions during each rotation, each mold adapted to receive a charge of molten glass at each of said charging positions, and means co-operating with the molds for forming the parisons and causing them to be discharged from the parison molds, finishing molds to receive the parisons, the forming and discharging of each parison taking place during the time its mold is traveling from one charging position to the next, whereby a plurality of series of articles are being concomitantly formed.

6. In a glass forming machine, the combination of a mold carriage, a ring of molds thereon, means to rotate the carriage and bring the molds successively to a plurality of charging stations during each rotation, mechanisms individual to said stations to introduce charges of glass into the molds, and means co-operating with the molds for blowing the charges to hollow form, whereby a plurality of series of blown glass articles are being formed simultaneously.

7. The combination with a mold carriage, of a ring of molds thereon, means to rotate the carriage, means for supplying two individual mold charges of glass at a time, and means for conveying said charges from the point of supply respectively to molds at diametrically opposite positions in their path of rotation.

8. The combination of a mold carriage, means to rotate it, a ring of molds on the carriage, means for supplying a plurality of charges of glass simultaneously, and means for conveying said charges and delivering them concomitantly to a plurality of said molds at diametrically opposite positions in said ring.

9. In a glass forming machine, the combination of a mold carriage, means to rotate it about a vertical axis, a plurality of groups of molds thereon, each group comprising a parison mold and a finishing mold, means to deliver charges of glass to each parison mold while at different predetermined positions of advancement in its rotation with the carriage and thereby supply each parison mold with a plurality of charges during each complete rotation of the mold carriage, glass forming means co-operating with the molds, and means to transfer each parison from its parison mold to its finishing mold while the parison mold is traveling between successive charging positions, and means to blow each parison in its finishing mold after a succeeding charge of glass has entered the parison mold of the same group.

10. The combination of a mold carriage, a ring of molds thereon, means to rotate the carriage continuously, automatic means to segregate charges of glass from a pool of molten glass, means to guide said charges to the molds and simultaneously introduce the charges of molten glass to a number of said molds at different rotative positions, and means co-operating with each mold to from the glass therein and discharge it from the mold during the travel of the mold from one charging position to the next.

11. The combination of a continuously rotating mold carriage, molds thereon, a frame mounted to oscillate about the axis of the mold carriage, chutes thereon arranged to register with molds at diametrically opposite positions on the carriage and deliver charges of glass thereto, and means to cause said frame to advance with the carriage while said chutes are in register with the molds and then return and cause said chutes to register with succeeding molds.

12. In a glass forming machine, the combination of a mold carriage mounted to rotate continuously about a vertical axis, a ring of molds thereon open at their upper ends to receive charges of glass, means to deliver charges to molds at diametrically opposite positions on the carriage, a frame mounted to oscillate about said axis, means to cause said frame to advance with the mold carriage and then return, heads carried by said frame at opposite sides of said axis, means for moving said heads into engagement with said open ends of the molds and move therewith during the advance of said frame, and means cooperating with said heads for forming the glass in the molds.

13. In a glass forming machine, the combination of a rotating mold carriage, a group of molds thereon comprising a blank mold, a finishing mold and neck molds, said blank and finishing molds arranged one above the other with the neck molds therebetween, a rotary transfer head carrying the neck molds, and automatic means actuated by the rotation of the mold carriage to rotate said head step by step about a horizontal axis and thereby move one neck mold from a position in register with the blank mold to a position in register with the finishing mold and simultaneously move another neck mold into register with the blank mold.

14. In a glass forming machine, the combination of a blank mold, a finishing mold, a transfer head, neck molds carried thereby and in register with said molds respectively, automatic means to rotate said head step by step through angles of 180 degrees and thereby periodically reverse the positions of said neck molds, said automatic means comprising a rack and pinion operative to rotate said head in one direction only, and means for supplying air through said head to blow the glass in the molds.

15. In a glass forming machine, the combination of a blank mold, a finishing mold, a transfer head, neck molds carried thereby and in register with said molds respectively, a rotary mold carriage on which said molds and head are carried, means actuated by the movement of the mold carriage to rotate said head and thereby reverse the positions of the neck molds, plungers carried by said head for forming initial blow openings in the glass in the blank molds, piston motors for actuating said plungers, and automatic means for supplying air under pressure to said motors for actuating them, and to the molds for blowing the glass therein.

16. In a glass forming machine, the combination of a parison mold and a finishing mold arranged one above the other, a transfer head, means on said head holding a parison, and automatic means for periodically rotating said head about a horizontal axis through a half revolution to transfer the parisons from one to the other of said molds, the rotation of said head being always in the same direction.

17. In a glass forming machine, the combination of a blank mold and a finishing mold arranged one above the other, a transfer head, a plurality of neck molds carried by said head, and automatic means for imparting a step by step rotation to said head always in the same direction about a horizontal axis and thereby move each neck mold periodically from a position in register with the blank mold to a position in register with the finishing mold.

18. In a glass forming machine, the combination of an inverted bland mold, a finishing mold therebeneath, a transfer head, a neck mold carried by said head, a reciprocating rack, a pinion in mesh therewith, and a one way driving connection between said pinion and said transfer head.

19. In a glass forming machine, the combination of a mold carriage, means to rotate it, a ring of inverted blank molds on the carriage, a ring of finishing molds on the carriage beneath the blank molds, transfer heads each arranged between a blank mold and its finishing mold, neck molds carried on said heads, said heads rotatable about horizontal axes, a stationary cam, racks on the carriage reciprocated by said cam, pinions actuated by said racks, and one way driving connections between the pinions and said heads for rotating the latter step by step.

20. In a glass forming machine, the combination of a rotatable mold carriage, a number of groups of molds on the carriage spaced at regular intervals around the axis of rotation, each group comprising a blank mold to receive a charge of glass and a finishing mold in which the charge is given its finished form, mold charging means operable to supply a charge of glass to each group of molds at each of a number of charging positions during each complete rotation of the group, and means to transfer each charge from the blank mold to the finishing mold of a mold group and retain the charge in the finishing mold until after the next succeeding blank has been received in the blank mold of said mold group.

21. The combination of a rotating mold carriage, a blank mold and a finishing mold thereon, means to supply charges of glass to the blank mold at different stations in its path of rotation, means to transfer the charges from the blank mold to the finishing mold, means to form the charges into finished articles in the finishing mold, and means for discharging each article from the finishing mold after the blank mold has received a charge from a different station from that supplying the charge for producing the said article.

22. The combination of a rotating mold carriage, a blank mold and a finishing mold thereon, means to supply charges of glass to the blank mold at diametrically opposite stations in its path of rotation, a charge being supplied to the blank mold each time it passes a station, means to form each charge in the blank mold during the first half rotation of the carriage after the charge enters the mold, means to transfer the blank to the finishing mold, means to give the blank its finished form in the finishing mold during the second half rotation of the carriage after said charge enters the blank mold, whereby during each half rotation of the carriage a charge from one station is formed in the blank mold and a charge from the other station is formed in the finishing mold.

23. The combination of a mold carriage, means to rotate it about a vertical axis, a plurality of groups of molds thereon, each group comprising a blank mold and a finishing mold, means to deliver charges of glass to each blank mold while at predetermined positions of advancement in its rotation with the carriage, thereby supplying each blank mold with a plurality of charges during each complete rotation of the mold carriage, means to transfer each charge from its blank mold to its finishing mold during the travel of the blank mold from one charging position to the next and without interrupting the movement of the carriage, and means to blow each charge of glass in its finishing mold after a succeeding charge of glass has entered the blank mold of the same group.

24. In a glass forming machine, the combination of a mold carriage rotatable about a vertical axis, a ring of blank molds thereon, a ring of complementary blow molds, means for feeding charges of glass to the blank molds at diametrically opposite points in the path of travel of the molds whereby each mold receives a charge during each half revolution of the mold carriage, means for transferring the charges from the blank molds to the finishing molds, said transfer means operating to remove each charge from its blank mold after it has been in the mold the greater part of a half revolution of the carriage whereby each mold carries a charge therein during the greater portion of its revolution.

25. The combination of a mold carriage, means to rotate it continuously about a vertical axis, a plurality of groups of molds thereon, each group comprising a blank mold and a finishing mold, means to deliver charges of glass to each blank mold while at predetermined positions of advancement in its rotation with the carriage, thereby supplying each blank mold with a plurality of charges during each complete rotation of the mold carriage, means controlled by the movement of the carriage for transferring each charge from its blank mold to its finishing mold during the travel of the blank mold from one charging position to the next, and means to blow each charge of glass in its finishing mold after a succeeding charge of glass has entered the blank mold of the same group.

Signed at Toledo, in the county of Lucas and State of Ohio, this 5th day of October, 1920.

LEONARD D. SOUBIER.